No. 740,777. PATENTED OCT. 6, 1903.
F. J. PORTER & E. D. STEVENSON.
TRANSMISSION GEARING FOR MOTOR VEHICLES.
APPLICATION FILED JAN. 31, 1903.
NO MODEL. 2 SHEETS—SHEET 1.
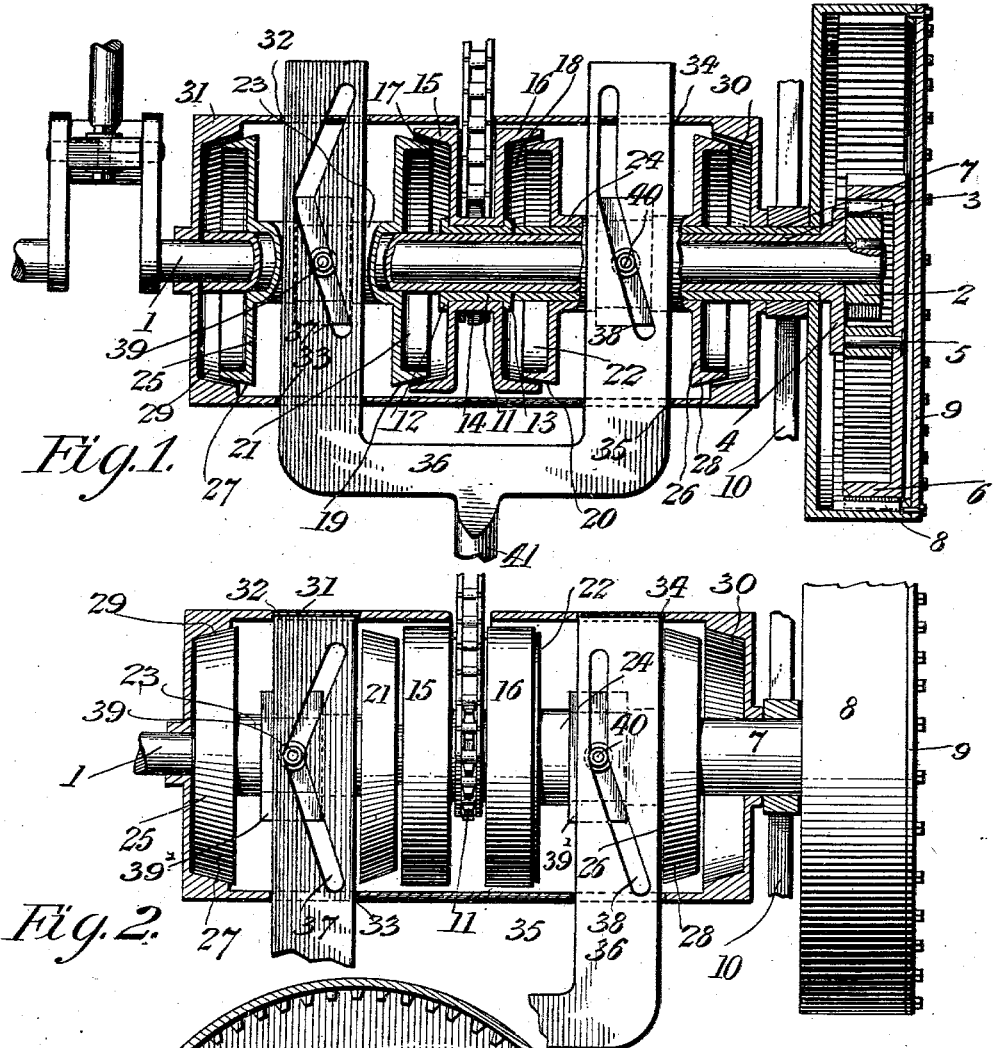
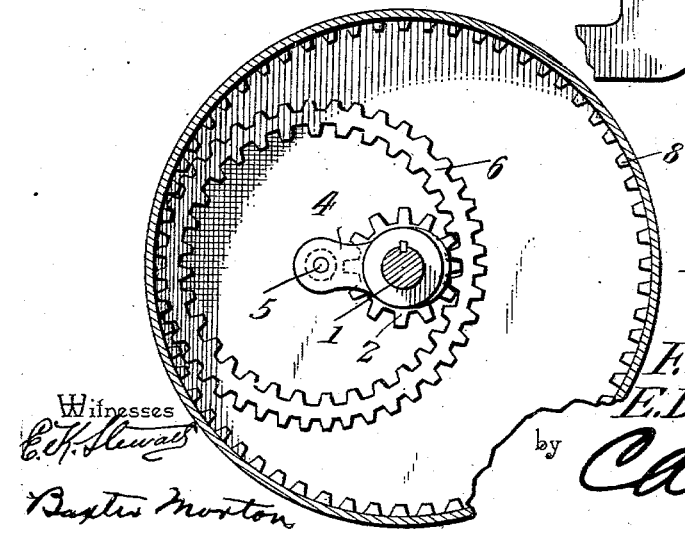
F. J. Porter and
E. D. Stevenson, Inventors

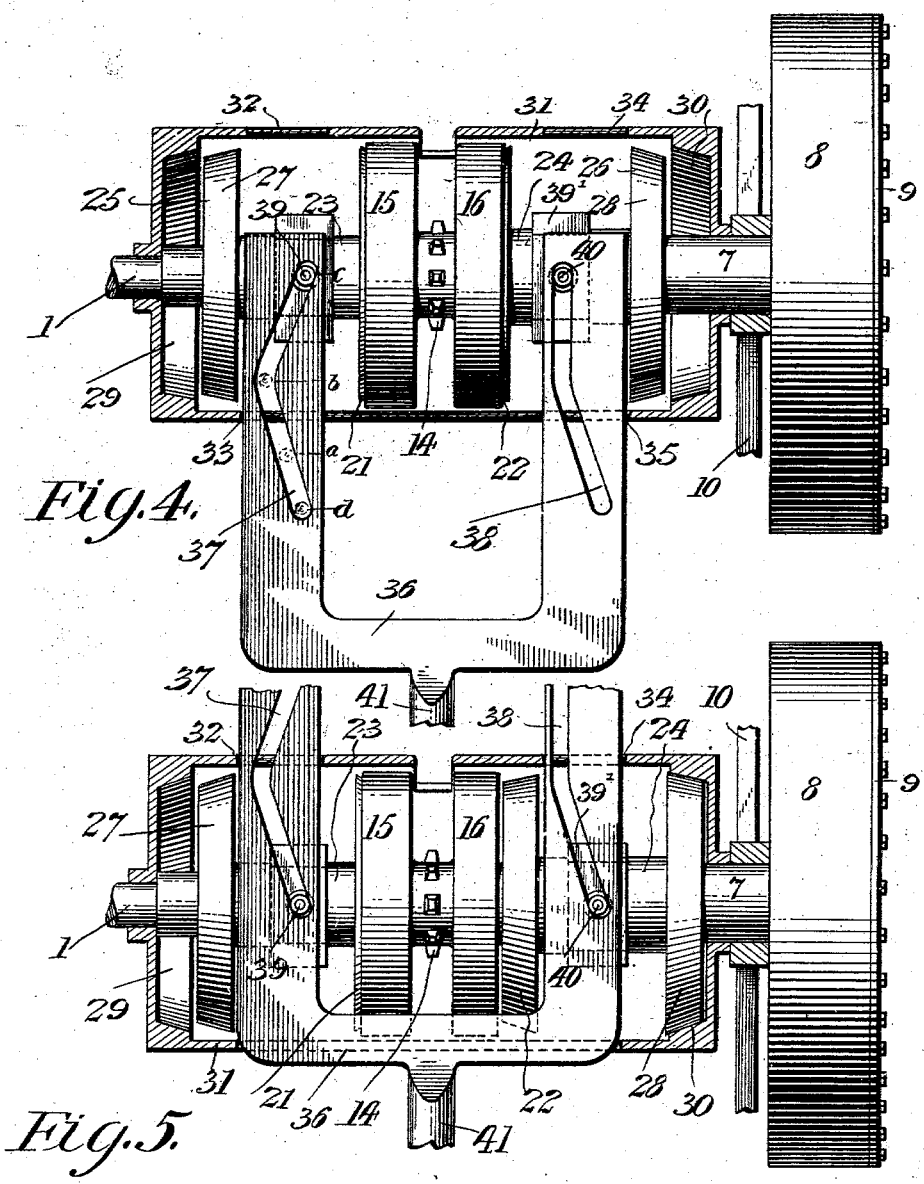

No. 740,777. Patented October 6, 1903.

UNITED STATES PATENT OFFICE.

FRANK J. PORTER AND EDWIN D. STEVENSON, OF WADSWORTH, OHIO.

TRANSMISSION-GEARING FOR MOTOR-VEHICLES.

SPECIFICATION forming part of Letters Patent No. 740,777, dated October 6, 1903.

Application filed January 31, 1903. Serial No. 141,383. (No model.)

*To all whom it may concern:*

Be it known that we, FRANK J. PORTER and EDWIN D. STEVENSON, citizens of the United States, residing at Wadsworth, in the county of Medina and State of Ohio, have invented a new and useful Transmission-Gearing for Motor-Vehicles, of which the following is a specification.

This invention relates to transmission-gearing for motor-vehicles, more especially to that type of motor-vehicles driven by explosive-engines.

In motor-vehicles driven by explosive-engines it is necessary to provide power-transmission gearing by means of which the vehicle may be driven forward at different speeds or driven backward at will, although the driving-shaft of the engine is ordinarily rotated constantly in one direction and at a uniform speed.

So far as we are aware all of the forms of power-transmission gearing designed to meet the requirements above mentioned are subject to various defects, among which may be mentioned excessive friction, noise in operation, multiplicity of parts, exposure to dust and dirt, and difficult and uncertain operation. We do not mean to imply that all of these defects are present in all of the forms of transmission-gearing with which we are acquainted; but one or more of the above-mentioned defects may be found in any of the forms of gearing that have come under our observation.

The object of our invention is to provide a power-transmission gearing in which all of the above-mentioned defects are eliminated and which may be controlled by a single movement of an operating-lever. To accomplish these ends, we make use of the mechanism hereinafter fully described and claimed, and shown in the preferred form in the accompanying drawings.

Figure 1 is a view in horizontal section through the casing and inclosed gears and through the clutch mechanism and the casing covering it, the various parts of the device being shown in the position taken when the vehicle is stationary. Fig. 2 is a plan view with the upper portion of the clutch-casing removed to show the clutch members in the position for slow speed ahead. Fig. 3 is a vertical section through the gear-casing and inclosed gears in a plane perpendicular to their axes of rotation. Fig. 4 is a view similar to Fig. 2, but showing the clutch members in position for fast speed ahead. Fig. 5 shows the clutch members in position for travel backward.

Referring to the drawings by reference characters, 1 represents the driving-shaft of an explosive-engine carrying at one end the spur-gear 2. Mounted concentrically with said shaft and rotatable thereon is a hollow shaft 3, having attached to one end thereof or made integral therewith an arm 4, which has rigidly secured thereto and projecting therefrom in a direction parallel with the shaft a pin 5, on which is journaled a gear 6, provided with internal and external teeth, as shown. Surrounding the hollow shaft 3 and rotatable thereon is another hollow shaft 7, having rigidly secured thereto the large internal gear 8. The spur-gear 2 and the combined internal and spur gear 6 are so proportioned that the spur-gear 3 is in mesh with the internal teeth of the combined gear and the large internal gear 8 is of such diameter that it is in mesh with the external teeth of the combined gear 6.

By means of a plate 9 suitably fastened to the free margin of the rim of the gear 8 that gear is made to form an oil-tight casing which completely protects the gears arranged therein from all damage from dust or dirt and insures their proper lubrication at all times.

A bearing for the hollow shaft 7 and the shafts 3 and 1 contained therein is afforded in a frame member 10, which is to be suitably connected to some portion of the vehicle frame or body.

Rigidly mounted on the hollow shaft 3 is a sleeve 11, provided with flanges 12 and 13, between which a sprocket-wheel 14 is rotatably mounted. Integral with the sprocket-wheel 14 are two clutch-plates 15 and 16, provided with the female clutch-surfaces 17 and 18, which are adapted to engage with male clutch-surfaces 19 and 20, provided on the clutch-plates 21 and 22. The clutch-plates 21 and 22 are integral with or rigidly secured to sleeves 23 24, slidably mounted, respectively, upon the hollow shaft 3 and the hollow shaft 7. The said sleeves also carry clutch-plates 25 26, having male clutch-surfaces 27 28, which are adapted to engage with the female clutch-surfaces provided at 29 and 30 in a casing 31, which covers the entire clutch mechanism and is rigidly secured to the frame member 10.

The casing 31 serves the double purpose of forming a portion of the clutch mechanism and affording protection for the operating members of the said mechanism.

Openings 32, 33, 34, and 35 are provided in the side walls of the casing 31 to permit the passage of a reciprocating cam-plate 36, provided with the two cam-grooves 37 and 38, with which engage, respectively, studs 39 and 40 on loose collars carried by sleeves 23 and 24. This cam-plate, together with the operating-lever 41, by which movement is imparted to the cam-plate, serves to actuate the clutch mechanism. The cam-plate 36 is provided with graduations marked a, b, c, and d, as shown, these graduations serving to indicate the various positions at which the cam-plate must be set when it is desired to stop the vehicle, to drive it foward at high or low speed, or to drive it backward.

The operation of our improved transmission-gearing will be readily understood from Figs. 1, 2, 4, and 5, in which we have shown the positions of the various members of the clutch mechanisms for stopping the vehicle, driving it forward at low and high speed, and for reversing it. Referring first to Fig. 1, in which the cam-plate is in position for stopping the vehicle, it will be observed that neither of the clutch-surfaces carried by the sprocket-wheel 14 is in engagement with one of the clutch-surfaces adapted to engage therewith. Consequently the rotation of the driving-shaft 1, while it communicates motion to the gears 6 and 8, has no effect upon the sprocket-wheel 14, from which power is to be transmitted to the rear axle of the vehicle. When the cam-plate is advanced to the position shown in Fig. 5, the sleeves 23 24 are shifted toward the frame member 10, the clutch-surface 19 is forced into engagement with the coöperating surface 17, and the clutch-surface 28 is in engagement with the surface 30. When this condition exists, the sleeve 24 is held stationary, and with it the hollow shaft 7 and gear 8. The sleeve 23 is given a rotation in the opposite direction to that of the driving-shaft 1, the gear 8 being held stationary and the gear 6 being in mesh with gear 8 and with the continuously-driven gear 2. The arm 4, at the end of which the gear 6 is mounted, is forced to revolve around the shaft 1 in the direction opposite to the direction of rotation of said shaft. This movement of the arm 4 causes the rotation of the hollow shaft 3 integral therewith and of the sleeve 23 mounted thereon, and from the sleeve 23 motion is communicated by means of the clutch-surfaces previously mentioned to the sprocket-wheel 14, causing the vehicle to travel backward. When the cam-plate is moved into the position shown in Fig. 2, the sleeves 23 24 are moved away from the frame member 10, the clutch-surface 27, carried by the sleeve 23, is forced into engagement with the coöperating surface 29, locking the sleeve 23 and the hollow shaft 3 against rotation, and the clutch-surface 20, carried by the sleeve 24, is forced into engagement with the clutch-surface 18, carried by the sprocket 14, so causing the sprocket 14 to rotate with the sleeve 24 and the hollow shaft 7, upon which said sleeve 24 is mounted. The direction of the rotation imparted to the sprocket when the parts are in the relation specified is the same as that of the driving-shaft 1, as will be readily seen. The speed of rotation is slow, however, as owing to the fact that the hollow shaft 3 is locked against rotation a single rotation of the continuously-driven spur-gear 2 will cause only about one-third of a rotation of the combined gear 6 and about one-fifth rotation of the gear 8, to which the hollow shaft 7 is secured. The sleeve 24, to which the sprocket is now locked, will of course be rotated correspondingly. When the cam-plate is shifted to the position shown in Fig. 4, the clutch-surfaces 18 and 20 remain locked in engagement, while the sleeve 23 is moved toward the frame member 10 and the clutch-surfaces 17 and 19 are brought into engagement. With the parts in this relation the sleeves 23 and 24, and consequently the hollow shafts 3 and 7, upon which said sleeves are mounted, respectively, are caused to rotate at the same rate of speed and the sprocket-wheel 14 is given a rotation at the same rate. This speed will be higher than that produced when the cam-plate is in the position shown in Fig. 2, because the speed imparted to both hollow shafts 3 and 7 is just the same as that of the driving-shaft 1, instead of about one-fifth, as in the case previously explained, and of course the direction of the rotation of the sprocket-wheel 14 is the same as that of the driving-shaft 1.

In explaining the different speeds obtained by setting the parts of the clutch mechanism in different positions reference is of course had only to the approximate proportions of the gears shown in the drawings, and we do not desire to limit ourselves to gears of these proportions, which may obviously be varied within wide limits without departing from the spirit of our invention.

It will have been observed from the foregoing account of the construction and operation of our improved power-transmission gearing that the change in direction and rate of speed and the release of the transmission-gearing from the driving-shaft are all brought about by a movement in one direction of the cam-plate 36, which movement is produced by means of a single operating-lever 41. It will also have been observed that all of the gears are completely protected from dust or dirt of any kind and their proper lubrication insured by means of their arrangement within the casing formed by the gear 8 and the plate 9 secured thereto. It will also have been observed that in no one of the various arrangements of the clutch mechanism for changing the speed or direction of movement or for stopping the carriage is any one of the gears left idle and there is no shifting of the gears into or out of engagement with one another.

All of the above features of construction and operation of our improved power-transmission gearing are regarded by us as distinctly advantageous in devices of this class, and by means of our construction we believe that we have remedied all the defects mentioned at the beginning of this specification as found in the forms of transmission-gearing known to us prior to our invention.

It is to be understood that we do not wish to be limited to the exact form, proportions, and mode of assemblage of the elements of our invention as shown and described, but reserve the right to make such changes therein as do not depart from the spirit of the invention and which lie within the scope of the appended claims.

What we claim as new, and desire to secure by Letters Patent, is—

1. In a power-transmission gearing for vehicles, the combination of an internal gear forming a casing, a combined internal and external gear rotatably and revolubly mounted within said gear and in mesh therewith, and a spur-gear mounted within the gears previously mentioned and in mesh with the combined gear, shafts for all of said gears and means for locking any of said gear against rotation, substantially as described.

2. The combination in a power-transmission gearing for vehicles, of an internal gear forming a casing, a combined internal and external gear rotatably and revolubly mounted within said casing-gear and in mesh therewith, and a spur-gear mounted within both of said gears concentric with the casing-gear and in mesh with the combined gear, shafts for all of said gears and means for locking any of said gears against rotation, substantially as described.

3. The combination in a power-transmission gearing for vehicles, of an internal gear forming a casing, a shaft upon which said gear is mounted, a combined internal and external gear rotatably and revolubly mounted within said casing-gear and in mesh therewith, an arm carrying said combined gear, said arm being rotatable on an axis concentric with said casing-gear, and a spur-gear mounted within said casing-gear and said combined gear and in mesh with said combined gear, a shaft carrying said spur-gear, and means for locking any of said gears against rotation, substantially as described.

4. The combination of a driving-shaft, a spur-gear mounted thereon, a hollow shaft concentric with said driving-shaft and carrying an arm, a combined external and internal gear mounted on said arm, a second hollow shaft concentric with the driving-shaft, an internal gear adapted to form a casing mounted on the last-mentioned hollow shaft and in mesh with the combined gear, and means for locking any of said gears against rotation, substantially as described.

5. The combination of a driving-shaft, a spur-gear rigidly secured to said shaft, a hollow shaft concentric with the driving-shaft, an arm rigidly secured to said hollow shaft, a combined external and internal gear carried by said arm and in mesh with the spur-gear, a second hollow shaft concentric with the driving-shaft, an internal gear adapted to form a casing rigidly secured to the last-mentioned hollow shaft and in mesh with the combined gear, a power-transmitting member rotatable on one of said shafts, and a clutch mechanism whereby the power-transmitting member may be locked to either hollow shaft, and means for locking any of said gears against rotation, substantially as described.

6. The combination of a driving-shaft, a spur-gear mounted thereon, a hollow shaft concentric with the driving-shaft and carrying an arm, a combined external and internal gear carried by said arm and in mesh with the spur-gear, a second hollow shaft concentric with the driving-shaft, an internal gear adapted to form a casing mounted on the last-mentioned hollow shaft and in mesh with said combined gear, a sleeve rigidly mounted on one of the hollow shafts, a power-transmitting member rotatable on said sleeve, and clutch mechanism whereby said power-transmitting member may be locked to either hollow shaft, and means for locking any of said gears against rotation, substantially as described.

7. A driving-shaft, a spur-gear rigidly secured to said driving-shaft, a hollow shaft concentric with said driving-shaft, an arm rigidly secured to said hollow shaft, a combined internal and external gear carried by said arm and in mesh with the spur-gear, a second hollow shaft concentric with the driving-shaft, an internal gear adapted to form a casing rigidly mounted on the last-mentioned hollow shaft and in mesh with the combined gear, a power-transmitting member rotatably mounted on one of said shafts, and clutch mechanism whereby said power-transmitting member may be simultaneously locked to both hollow shafts, substantially as described.

8. In a power-transmission gearing for vehicles, the combination of a driving-shaft, a gear mounted thereon, hollow shafts concentric with the driving-shaft and gears mounted thereon, all of said gears being continuously operative and in mesh, a power-transmitting member rotatably mounted upon one of the hollow shafts, clutch mechanism whereby said power-transmitting member may be locked into engagement with either of said hollow shafts, means for holding either of said hollow shafts stationary, substantially as described.

9. In a power-transmission gearing for vehicles, the combination of a driving-shaft, a gear mounted thereon, hollow shafts concentric with the driving-shaft and gears mounted thereon, all of said gears being continuously operative, a sprocket-wheel rotatably mounted on one of the hollow shafts, and clutch mechanism whereby said sprocket-wheel may be locked into engagement with both of said hollow shafts, substantially as described.

10. In a power-transmission gearing for vehicles, the combination of a driving-shaft, a gear secured thereto, hollow shafts concentric with the driving-shaft, gears carried by said hollow shafts, all of said gears being continuously operative, a sprocket-wheel rotatably mounted upon one of the hollow shafts, and clutch mechanism comprising sleeves splined to the hollow shafts and having male clutch-cones, female clutch-cones carried by the sprocket, and means for causing the clutch-cones carried by the sleeves to engage with those carried by the sprocket, substantially as described.

11. In a power-transmission gearing for vehicles, the combination of a driving-shaft, a gear secured to said shaft, hollow shafts concentric with the driving-shaft, gears carried by said hollow shafts, all of said gears being continuously operative, sleeves splined to said hollow shafts and having male clutch-cones, a sprocket-wheel rotatably mounted on one of said hollow shafts and having female clutch-cones, and means, comprising a cam-plate, for causing the clutch-cones carried by the sleeves to engage with those carried by the sprocket-wheel, substantially as described.

In testimony that we claim the foregoing as our own we have hereto affixed our signatures in the presence of two witnesses.

FRANK J. PORTER.
EDWIN D. STEVENSON.

Witnesses:
JOHN H. DURLING,
J. K. DURLING.